(12) United States Patent
Tengner et al.

(10) Patent No.: US 9,991,713 B2
(45) Date of Patent: Jun. 5, 2018

(54) ENERGY STORAGE SYSTEM COMPRISING A MODULAR MULTI-LEVEL CONVERTER

(71) Applicant: ABB SCHWEIZ AG, Baden (CH)

(72) Inventors: Tomas Tengner, Västerås (SE); Christopher Townsend, Newcastle (AU); Hector Zelaya de la Parra, Västerås (SE); Alireza Nami, Västerås (SE)

(73) Assignee: ABB SCHWEIZ AB, Baden (CH)

( * ) Notice: Subject to any disclaimer, the term of this patent is extended or adjusted under 35 U.S.C. 154(b) by 0 days. days.

(21) Appl. No.: 15/117,094

(22) PCT Filed: Feb. 19, 2014

(86) PCT No.: PCT/EP2014/053170
§ 371 (c)(1),
(2) Date: Aug. 5, 2016

(87) PCT Pub. No.: WO2015/124176
PCT Pub. Date: Aug. 27, 2015

(65) Prior Publication Data
US 2017/0170658 A1    Jun. 15, 2017

(51) Int. Cl.
*H02M 7/483* (2007.01)
*H02J 3/18* (2006.01)
*H02J 3/28* (2006.01)
*H02J 3/36* (2006.01)

(52) U.S. Cl.
CPC .............. *H02J 3/1857* (2013.01); *H02J 3/28* (2013.01); *H02J 3/36* (2013.01); *H02M 7/483* (2013.01); *H02M 2007/4835* (2013.01)

(58) Field of Classification Search
CPC ............ H02M 7/42; H02M 7/44; H02M 7/48; H02M 7/483; H02M 2007/4835; H02M 7/487; H02M 7/49; H02M 7/493; H02M 7/537; H02M 7/5387; H02M 7/5388; H02M 7/797; H02J 3/18; H02J 3/1842; H02J 3/1857; H02J 3/32; H02J 3/28; H02J 3/36; Y02E 40/26; Y02E 60/60
See application file for complete search history.

(56) References Cited

U.S. PATENT DOCUMENTS

| 2012/0195084 A1* | 8/2012 | Norrga | H02M 7/483 |
| | | | 363/127 |
| 2013/0148392 A1* | 6/2013 | Inoue | H02M 7/10 |
| | | | 363/68 |

(Continued)

FOREIGN PATENT DOCUMENTS

| DE | 10 2010 022 043 A1 | 12/2011 |
| WO | WO 2011/042050 A1 | 4/2011 |
| WO | WO 2012/103936 A1 | 8/2012 |

*Primary Examiner* — Timothy J Dole
*Assistant Examiner* — Ivan Laboy Andino
(74) *Attorney, Agent, or Firm* — Birch, Stewart, Kolasch & Birch, LLP

(57) ABSTRACT

An energy storage system (ESS) for an electrical system includes an energy storage, and a converter interface arranged for connecting the energy storage to the electrical system. The converter interface includes a modular multi-level converter in which each phase leg includes a plurality of series connected cells of which at least one is a half-bridge cell and at least one is a full-bridge cell.

7 Claims, 5 Drawing Sheets

(56) References Cited

U.S. PATENT DOCUMENTS

| | | | |
|---|---|---|---|
| 2013/0308235 A1* | 11/2013 | Davies | H02H 7/1257 361/62 |
| 2014/0028266 A1* | 1/2014 | Demetriades | H02J 3/32 320/136 |
| 2014/0059373 A1* | 2/2014 | Larsson | H02J 3/18 713/340 |
| 2015/0069839 A1* | 3/2015 | Tengner | H02J 3/32 307/48 |
| 2015/0108844 A1* | 4/2015 | Zhou | H02J 9/062 307/80 |
| 2015/0357905 A1* | 12/2015 | Nami | H02M 1/32 363/53 |
| 2015/0372612 A1* | 12/2015 | Nami | H02M 7/219 363/123 |
| 2016/0126827 A1* | 5/2016 | Dong | H02M 1/32 363/50 |

* cited by examiner

ENERGY STORAGE SYSTEM COMPRISING A MODULAR MULTI-LEVEL CONVERTER

TECHNICAL FIELD

The present disclosure relates to an energy storage system (ESS) with a converter interface for an electrical system.

BACKGROUND

Modular multilevel converters are often used because of their high efficiencies, their modularity and scalability, as well as for their ability to produce voltage waveforms with low harmonic content which effectively reduce the need for large alternating current (AC) filters. Several modular multilevel converter topologies exist, e.g. M2LC (also called MMLC and MMC) modular multilevel converter, in particular in high voltage direct current (HVDC) applications but also in motor drives etc.

The modular multilevel converter can be used as a converter interface for an energy storage systems (ESS), e.g. a Battery Energy Storage Systems (BESS), where a high voltage (Li-ion, Pb-Acid, NAS, SuperCapacitor or similar) direct current (DC) energy storage system is connected to a common DC link of the converter. However the very high voltage of the common DC link of the converter is a disadvantage in the ESS application, since the converter needs to have a correspondingly high voltage rating. The high voltage adds cost for insulation, as well as for fault handling and circuit breakers. The ESS can be equipped with a distributed DC breaker based on insulated-gate bipolar transistors (IGBTs), which adds a significant cost to the system, and produces losses.

Electrochemical batteries and supercapacitors will vary their voltage during a charge-discharge cycle. The discharge profile depends mainly on battery chemistry, but is also influenced by battery temperature, charge-discharge rate, aging of battery etc. Any kind BESS converter will need to handle the variable DC voltage of the battery(-ies), and that comes to an expense of de-rating (voltage-wise).

FIG. 1 shows typical voltage profiles for a battery discharged at different rates, wherein the C-rate is defined as current (in Amperes) divided with Coulomb capacity (in Ah).

FIG. 2 shows a standard BESS with a five-level M2LC (one phase leg shown) in which a plurality of half-bridge converter cells, each with a capacitor, are connected in series, four half-bridge cells forming the upper (positive) arm and four half-bridge cells forming the lower (negative) arm.

WO 2011/042050 discloses a voltage source converter with a first group of cells which is only capable of unipolar voltage contribution and a second group of cells being capable of bipolar voltage contribution. The circuit configuration allows for a higher flexibility in control.

WO 2012/103936 relates to eliminating a fault on a HVDC line by including at least one H-bridge submodule in a phase branch of a self-commutated converter.

SUMMARY

It is an objective of the present invention to provide an improved energy storage system (ESS) converter interface for electrical systems, such as power grids, e.g. for high voltage applications.

According to an aspect of the present invention, there is provided an ESS for an electrical system. The ESS comprises an energy storage, and a converter interface arranged for connecting the energy storage to the electrical system. The converter interface comprises a modular multilevel converter (M2LC) in which each phase leg comprises a plurality of series connected cells of which at least one is a half-bridge cell and at least one is a full-bridge cell.

According to another aspect of the present invention, there is provided a method performed in an ESS connected to an electrical system. The ESS comprises an energy storage and a converter interface connecting the energy storage to the electrical system. The converter interface comprises a modular multilevel converter (M2LC) in which each phase leg comprises a plurality of series connected cells of which at least one is a half-bridge cell and at least one is a full-bridge cell. The method comprises operating the at least one full-bridge cell to produce positive voltage. The method further comprises operating the at least one full-bridge cell to produce negative voltage.

By using at least one full-bridge cell in each arm of the M2LC, voltage can be produced which adds to the voltage of the energy storage when the energy storage has a low charging level or otherwise produces a low voltage, in order to match the system voltage of the electrical system, e.g. an AC grid. Thus, the high voltage of the common DC link in the converter when the energy storage is fully charged can be reduced. Thereby the cost of the ESS can be reduced by using a lower voltage rating, e.g. fewer components (such as fewer modular cells in the M2LC) and less insulation.

Embodiments of the present invention allows for the design of transformer-less static synchronous compensator (STATCOM) with energy storage with a higher AC connection voltage than would otherwise be allowed by the restriction in energy storage voltage. Further, embodiments of the present invention allows for more controllability over the normal operation of an ESS by achieving a proper circulating current and modulation control. Further, embodiments of the present invention allows for having DC fault current limitation within the converter arm.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The present invention provides a solution that reduces the cost for the derating, and provides an extra degree of freedom in choosing the DC link and storage (e.g. battery) voltage. Battery voltage, negative-sequence capability and voltage-ampere (VA) rating can be optimized, in order to provide a high power ESS of more optimal cost. The invention proposes that some of the half-bridge cells in the standard M2LC are replaced by full-bridge cell(s).

Figure 1:
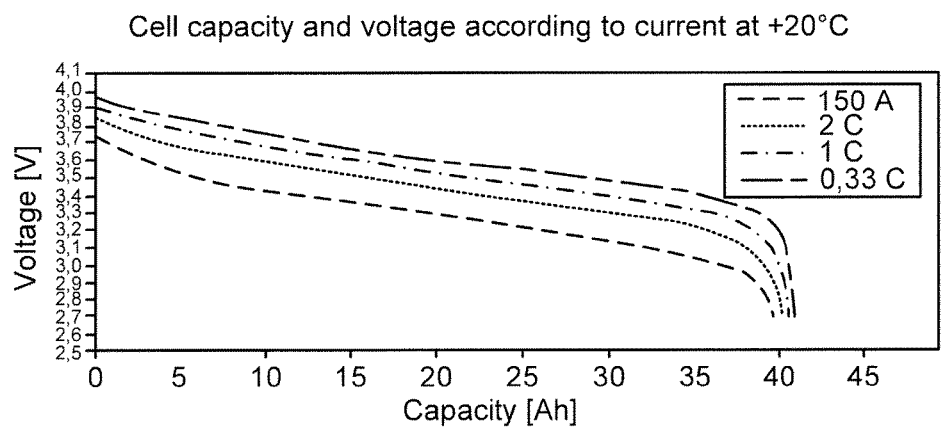
FIG. 1 is a graph illustrating how voltage varies with the cell capacity in a converter for different currents, in accordance with prior art.
Figure 2:
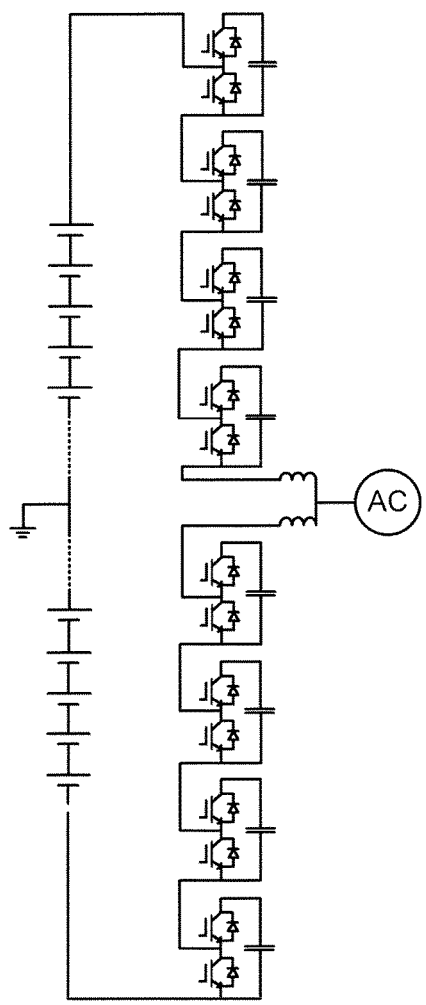
FIG. 2 is a circuit diagram of a phase leg of a prior art ESS converter interface.
Figure 3:
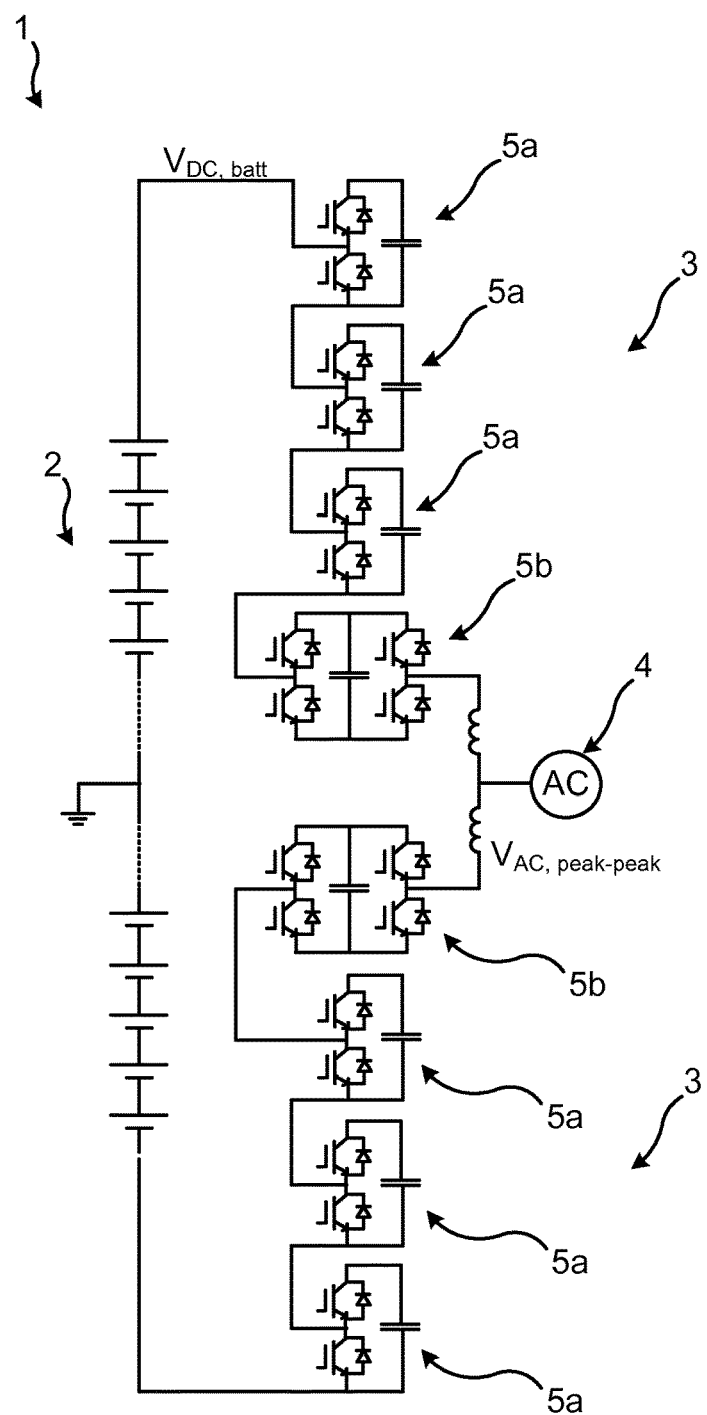
FIG. 3 is a schematic circuit diagram of a phase leg of an embodiment of an ESS converter interface, in accordance with the present invention.

FIG. 3 is a schematic circuit diagram of a phase leg of an embodiment of an ESS 1 converter interface, in accordance with the present invention. The ESS 1, e.g. a battery energy storage system (BESS) or a supercapacitor ESS, comprises an energy storage 2 and a converter interface comprising a modular multilevel converter (M2LC) 3. The term M2LC is not intended to limit the converter to a specific type of M2LC converter, since any type of modular multilevel converter may be used with the present invention. The converter interface connects the DC energy storage 2 with the electrical system 4, e.g. an AC system such as an AC power grid or an AC motor drive, or alternatively a HVDC line connected in parallel with the energy storage 2. The M2LC 3 leg comprises an upper arm connected to the positive pole of the DC link of the converter and a lower arm connected to the negative pole of the DC link of the converter. The M2LC 3 of the embodiment in FIG. 3 is a five-level converter, implying that each arm of the phase leg has four modular cells 5 connected in series, but in other embodiments within the present invention may have any number of levels as required. Each cell 5 comprises a capacitor and a plurality of switches, each typically with an associated diode. The switches are in FIG. 3 as an example depicted as insulated-gate bipolar transistors (IGBT). However, it should be noted that these are only examples of the components of the cells. Other corresponding components known in the art may alternatively be used. As is well-known in the field, the cells of an M2LC may be half-bridge cells, with two switches, or full-bridge cells (H-bridge), with four switches. As is shown in FIG. 2, half-bridge cells are used in the converter interface of an ESS since the cells need only conduct current in one direction, and full-bridge cells are also substantially more expensive since they require more components. However, in accordance with the present invention, the converter 3 of the ESS 1 has a mix of both half-bridge cells 5a and full-bridge cells 5b. In the embodiment of FIG. 3, each arm of the phase leg has three half-bridge cells 5a and 1 full-bridge cell 5b, but other embodiments with two or even three of the four cells 5 being full-bridge cells 5b are also contemplated. In FIG. 3, the full-bridge cell(s) are closest to the AC system 4. This may be preferred in some embodiments, but any order of half-bridge cells 5a and full-bridge cells 5b within each arm may be used as convenient.

Replacing some half-bridge cells 5a with full-bridge cells 5b enables the converter arms to synthesize (at least some) negative voltage that makes it possible to operate the converter 3 with a DC link voltage $V_{DC, batt}$ lower than the line peak-to-peak voltage $V_{AC, peak-peak}$. At the same time, the arm voltage rating will not need to be increased to handle the variable battery voltage, since when the battery voltage is low, the full-bridge(s) 5b may synthesize a sinusoidal voltage without or with reduced DC offset. When battery voltage is high, the full-bridge cells may be operating as half-bridges 5a, producing only positive (or negative) voltage.

Figure 4A:
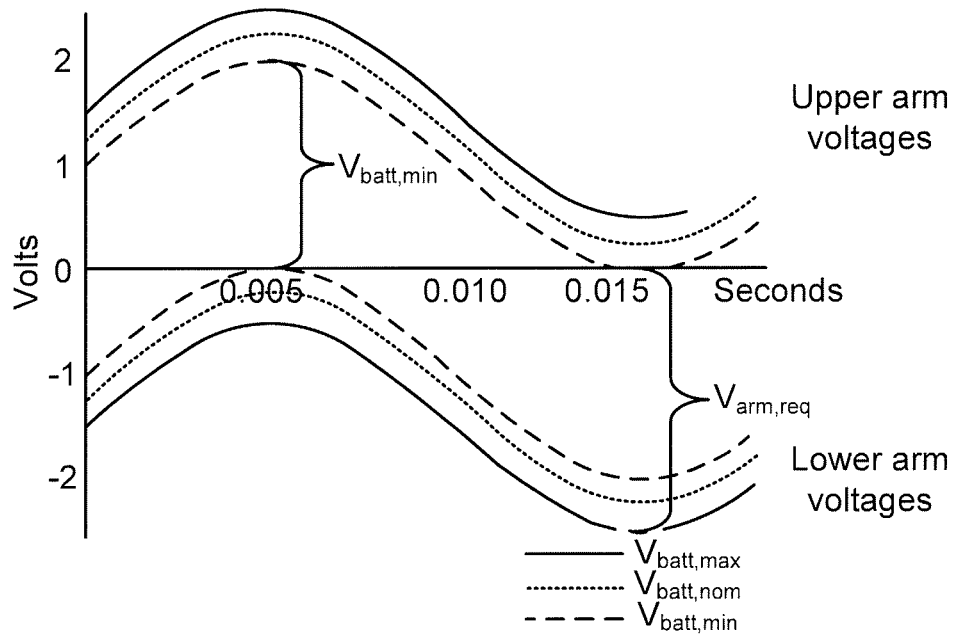
FIG. 4a is an exemplary graph of a standard M2LC-BESS voltage waveform.

FIG. 4a shows upper and lower arm voltage waveforms for a standard M2LC-BESS. The full lines represent the waveforms at maximum battery voltage, the dashed lines represent the waveforms at minimum battery voltage, and the dotted lines represent the nominal battery voltage. Thus, the minimum battery voltage $V_{batt, min}$ is the distance between the dashed line waveforms. Since only half-bridge cells 5a are used, the arm voltages are prohibited from crossing the zero line in the graph. The maximum voltage $V_{arm, req}$ over each of the arms of the converter, i.e. the voltage the arm is required to be rated for, is the distance between the peak voltage at maximum battery voltage and the zero voltage line.

Figure 4B:
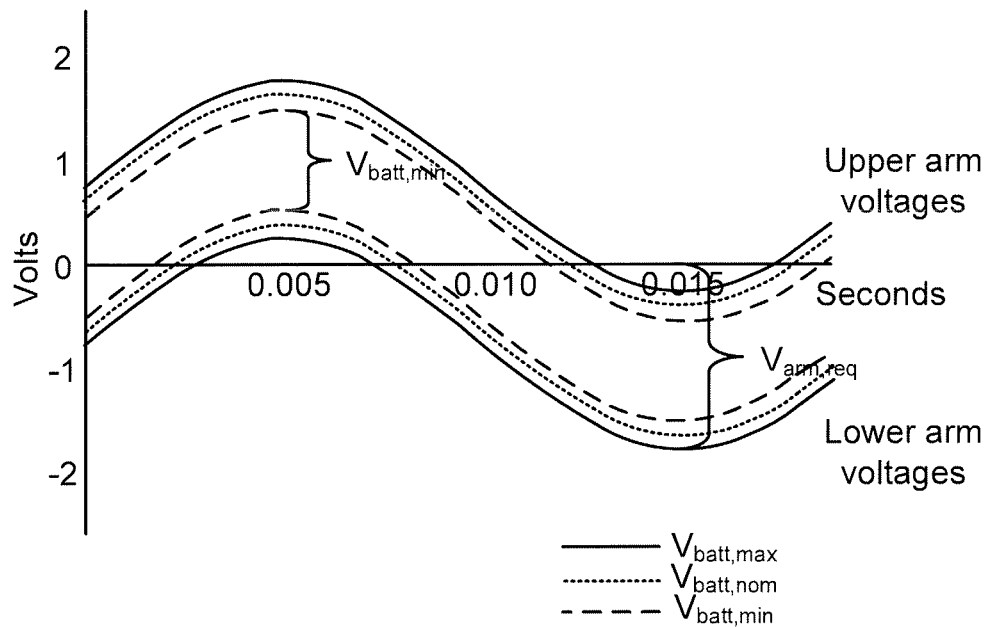
FIG. 4b is an exemplary graph of an M2LC-ESS voltage waveform of an embodiment of the present invention.

FIG. 4b shows upper and lower arm voltage waveforms for the same arrangement as in 4a but where the converter has been changed for a converter 3 in accordance with the present invention, thus having some full-bridge cells 5b able to provide negative arm voltage capability. The full lines represent the waveforms at maximum battery voltage, the dashed lines represent the waveforms at minimum battery voltage, and the dotted lines represent the nominal battery voltage. Thus, the minimum battery voltage $V_{batt, min}$ is the distance between the dashed line waveforms. Due to the use of full-bridges for boosting the battery voltage by producing negative voltage, the arm voltages are allowed to pass the zero line in the graph, whereby the $V_{batt, min}$ is substantially smaller than for the standard converter of FIG. 4a. Consequently, the maximum voltage $V_{arm, req}$ over each of the arms of the converter are is also markedly reduced and is less than the AC peak-to-peak voltage.

In FIGS. 4a and 4b, it has been assumed a battery voltage that varies about 33%, e.g. from between approximately 2.7 to 4.0 V per battery cell. This is realistic and may even be a bit conservative. For instance, the battery cells of the energy storage 2 used in some BESS can be safely operated between 2.3 and 4.1 V. Supercapacitors may have an even larger voltage variation. In the FIGS. 4a and 4b it has also been assumed that one out of four half bridge cells 5a has been replaced with a full-bridge cell 5b. To optimize cost and losses, the ratio between half- and full-bridge cells 5 may be selected differently for different applications. The energy storage 2 of the present invention may have a relatively high nominal voltage, e.g. at least 30 kV or at least 50 kV, and/or up to 70 kV or up to 100 kV.

Example 1

When the DC link voltage is reduced, a larger current is needed to handle negative-sequence load currents at the AC side of a converter 3.

A first step to control the second order harmonic is to find the voltage ripple on the capacitors and correct the insertion index at all times using this voltage ripple. Then the modulation indices of upper and lower arms of a phase leg, e.g. of phase A, are as follows:

$$nau_{arm} = \frac{U_{battery} - mU\sin(\omega t)}{2U + U_{ruarm}} \quad (I)$$

$$nal_{arm} = \frac{U_{battery} - mU\sin(\omega t)}{2U + U_{rlarm}} \quad (II)$$

Where:
$nau_{arm}$=insertion index for the upper arm Aa.
$nal_{arm}$=insertion index for the lower arm Ab.
$U_{battery}$=battery 2 pole-to-ground voltage.

$$U = \frac{\hat{U}_{AC,pole\text{-}to\text{-}ground}}{m} \quad (III)$$

m=modulation index of the cells 5.
$U_{ruarm}$=voltage reference value to compensate for capacitor voltage ripples in both half-bridge 5a and full-bridge 5b cells in the upper arm.
$U_{rlarm}$=voltage reference value to compensate for capacitor voltage ripples in both half-bridge 5a and full-bridge 5b cells in the lower arm.

A preliminary solution for finding these voltage ripples is to filter out the sum of the capacitor voltages via the filter. First, the DC component of the capacitor voltages is cancelled out by using a first-order band stop filter at:

$$\omega = 0\frac{rad}{sec} \quad (IV)$$

After the DC component is cancelled out, 10 second-order bandpass filters are used to extract the voltage ripples. A circulating current control and voltage balancing of the converter 3 arm can be achieved while 40% voltage drop has been applied at the DC side, when full-bridge cells 5b are generating the negative arm voltage while half-bridges are bypassed.

Example 2

To select the best and most cost-effective ratio between the number of half-bridge cells 5a and full-bridge cells 5b, an optimization may be performed and it is proportional to the voltage drop. Normally, half of the voltage drop rating is required for the full-bridge cell(s) 5b in each arm to be able to have maximum AC voltage. However, factors that must be considered include but are not limited to
  Cost for converter 3 voltage over-rating related to energy storage 2 voltage variations.
  Cost for converter 3 current over-rating related to negative-sequence requirements.
  Energy storage 2 system rating and additional cost for high-voltage protection such as static DC breakers.

Figure 5A:
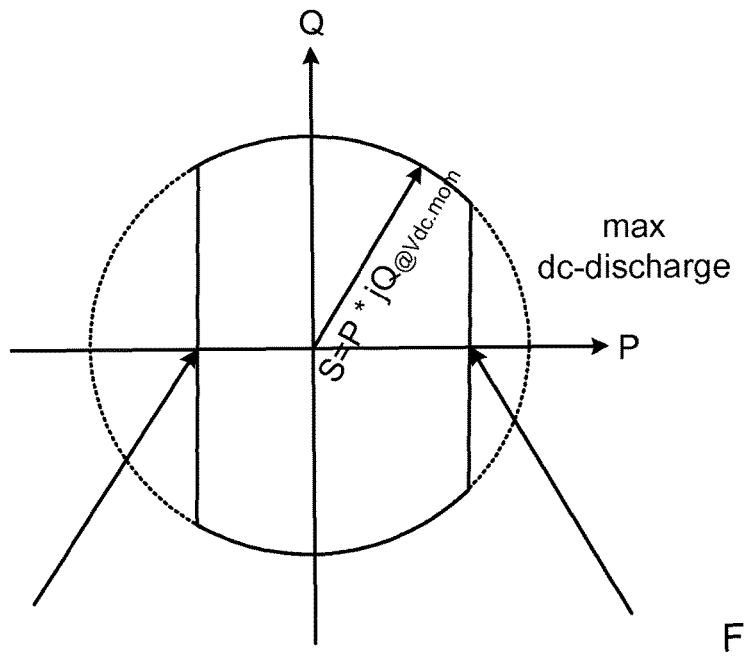
FIG. 5a is a graph illustrating active (P) and reactive (Q) power characteristics of an embodiment of an ESS in accordance with the present invention operating at maximum DC link voltage.
Figure 5B:
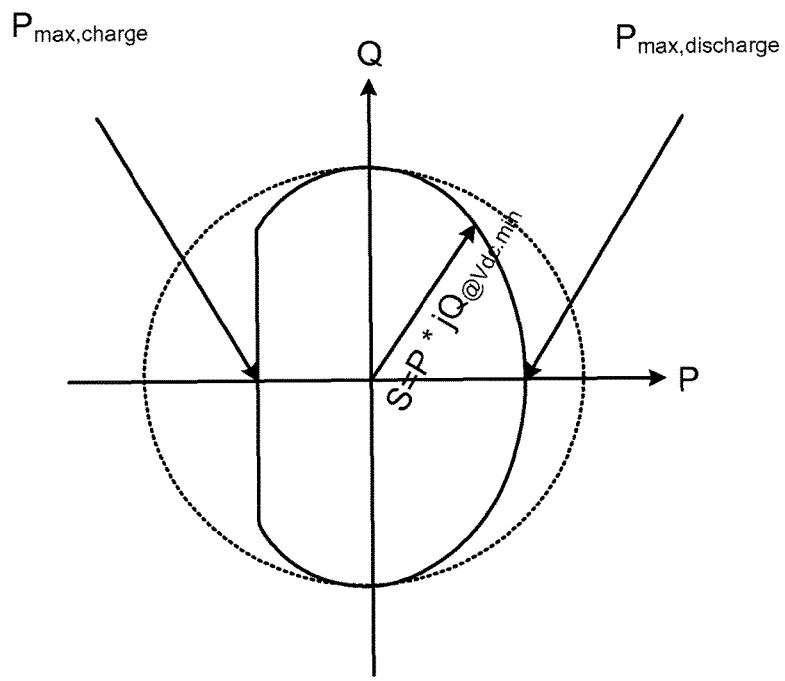
FIG. 5b is a graph illustrating active (P) and reactive (Q) power characteristics of an embodiment of an ESS in accordance with the present invention with a reduced DC link voltage.

It can be mathematically shown that the DC link voltage dropping while maintaining a stable operation for the converter has some limitation. This is shown in FIGS. 5a and 5b in which the real (P) and reactive (Q) power characteristics for the ESS of the present invention are considered. FIG. 5a relates to a situation with maximum energy storage 2 voltage, while FIG. 5b relates to a situation when the converter 3 operates with a reduced energy storage 2 voltage and thus a reduced DC link voltage. S is apparent power, P is active (real) power, Q is reactive power and j is the imaginary operator. It is noted that this is a generic illustration, and that actual P-Q diagrams may be somewhat different.

One conservative limit was found based on the energy fluctuation in the full-bridge cells 5b. To have zero energy in each half and full bridge cells over one cycle allows to find out whether the full-bridges 5b can regain this lost energy during the negative voltage generation or not. At this limit, all non-DC circulating currents were assumed to be cancelled out by a perfect current controller.

Another limit was found based on the sign of the current in the arm.

Simulation results show that voltage drop of up to 50% is possible without having to make any major considerations.

Example 3

Figure 6:
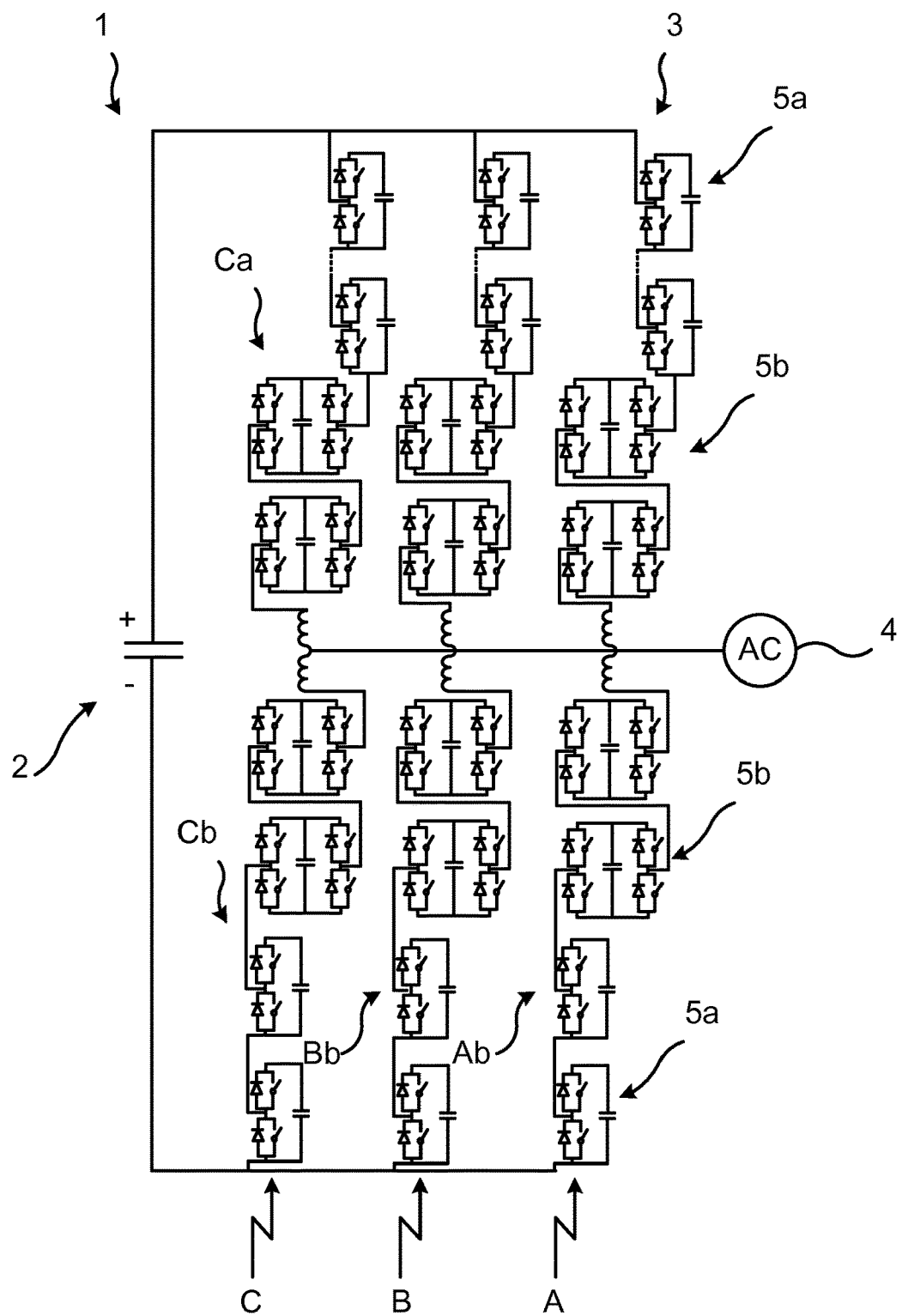
FIG. 6 is a schematic circuit diagram of an embodiment of an ESS with a three-phase converter interface in accordance with the present invention.

FIG. 6 illustrates an example of an ESS 1 of the present invention, in which a 3-phase M2LC 3 is used. The converter 3 has three phase legs A, B and C, to each of which as an upper arm Aa, Ba and Ca as well as a lower arm Ab, Bb and Cb. Again, the converter 3 is a five-level converter in which each arm has four modular cells 5. In accordance with the present invention, each arm has at least one half-bridge cell 5a and at least one full-bridge cell 5b. In the exemplary embodiment of FIG. 6, each arm has two half-bridge cells 5a and two full-bridge cells 5b. As discussed herein, the present invention may be used with any number of phases and levels of the converter 3.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:
1. A method performed in an energy storage system (ESS) being connected to a high voltage AC electrical system, the ESS comprising an energy storage and a converter interface having a DC link and connecting the energy storage to the high voltage AC electrical system, wherein the converter interface comprises a modular multilevel converter in which each phase leg comprises an upper arm connected to a positive pole of the DC link of the modular multilevel converter and a lower arm connected to a negative pole of the DC link of the modular multilevel converter, each arm comprising a plurality of series connected cells of which at least one is a half-bridge cell and at least one is a full-bridge cell, the method comprising:
  when a DC link voltage (VDC, batt) provided by the energy storage is more than or equal to a peak-to-peak voltage (VAC, peak-peak) of the high voltage AC electrical system, operating the at least one full-bridge cell to produce positive voltage; and subsequently
  when the DC link voltage (VDC, batt) provided by the energy storage is less than the peak-to-peak voltage

(VAC, peak-peak) of the high voltage AC electrical system, operating the at least one full-bridge cell to produce negative voltage.

2. The method of claim 1, wherein the ESS has a nominal voltage of at least 30 kV or at least 50 kV, and/or up to 70 kV or up to 100 kV.

3. The method of claim 1, wherein the modular multilevel converter has three, and only three, phase legs.

4. The method of claim 3, wherein the ESS has a nominal voltage of at least 30 kV or at least 50 kV, and/or up to 70 kV or up to 100 kV.

5. The method of claim 1, wherein the energy storage comprises an electrochemical battery or a supercapacitor.

6. The method of claim 5, wherein the modular multilevel converter has three, and only three, phase legs.

7. The method of claim 5, wherein the ESS has a nominal voltage of at least 30 kV or at least 50 kV, and/or up to 70 kV or up to 100 kV.

\* \* \* \* \*